Dec. 16, 1969
W. O. TRISSELL
3,483,875
HAIRPIECE AND METHOD OF MAKING SAME
Filed Nov. 7, 1967
2 Sheets-Sheet 1
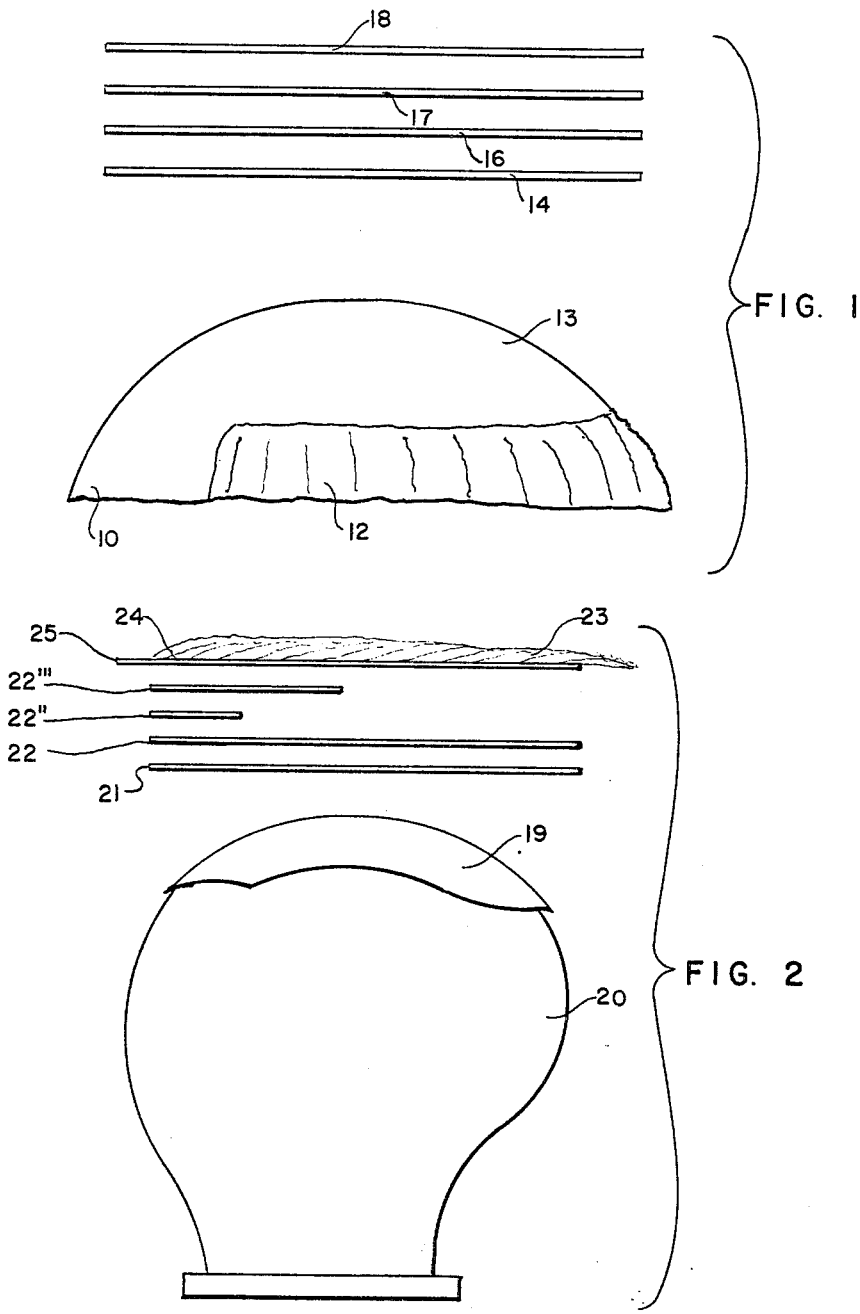
INVENTOR.
WILLIAM O. TRISSELL
BY
*Pearce & Schaefarklaus*
Attorneys.

Dec. 16, 1969  W. O. TRISSELL  3,483,875
HAIRPIECE AND METHOD OF MAKING SAME
Filed Nov. 7, 1967  2 Sheets-Sheet 2

INVENTOR.
WILLIAM O. TRISSELL
BY
*Pearce and Schaeperklaus*
Attorneys

United States Patent Office 3,483,875
Patented Dec. 16, 1969

3,483,875
HAIRPIECE AND METHOD OF MAKING SAME
William O. Trissell, Cheviot, Ohio
(6th and Main Sts., Cincinnati, Ohio 45202)
Filed Nov. 7, 1967, Ser. No. 681,185
Int. Cl. A41g 5/00
U.S. Cl. 132—5    7 Claims

ABSTRACT OF THE DISCLOSURE

A method of forming a hairpiece in which a shell mold is formed of glass fiber fabric and plaster of Paris which conforms to the shape of a head and a hairpiece is formed on the shell mold with a body of resin impregnated glass fiber fabric and a fabric mesh to which hair strands are attached, the resin uniting the glass fiber fabric body and the mesh and locking the hair strands to the mesh and to the glass fiber fabric body.

---

This invention relates to hairpieces or toupees and to a method of making a hairpiece.

Ordinarily, hairpieces are formed on an openwork fabric mesh, sometimes called "Swiss silk" to which hair strands are attached by a process known as "ventilating" by which the strands are threaded through the mesh and knotted to the mesh. Such hairpieces may be subject to rapid deterioration and require very careful treatment to avoid disintegration.

An object of this invention isto provide a method of forming a hairpiece which resists deterioration caused by perspiration and cleaning and which is light in weight, durable and natural looking.

A further object of this invention is to provide a hairpiece having a glass fiber fabric body, hair mounted on a piece of fabric mesh, and a resin uniting the glass fiber fabric body and the fabric mesh and locking stands of hair to the mesh.

Briefly, the method of this invention includes preparation of a shell mold which sustantially conforms to the shape of a head. On the shell mold is built up a glass fiber fabric cloth body. Hair is ventilated in a sheet of fabric mesh. Then, the body is impregnated with a resin such as an epoxy resin and the ventilated mesh is mounted on the resin impregnated fiber glass body. When the resin cures, the ventilated mesh becomes bonded to the glass fiber fabric body and the knots of the strands of hair are locked in place by the resin.

The above and other objects and features of the invention will be apparent to those skilled in the art to which this invention pertains from the following detailed description, and the drawing, in which:

FIG. 1 is an exploded view showing a fragmentary portion of a human head in connection with sheets of material used in forming a shell mold in accordance with steps of the method of this invention;

FIG. 2 is an exploded view showing a head form with the shell mold in placed thereon and with sheets of material used in forming a hairpiece thereon;

In the following detailed description, and the drawing, like reference characters indicate like parts.

Figure 3:
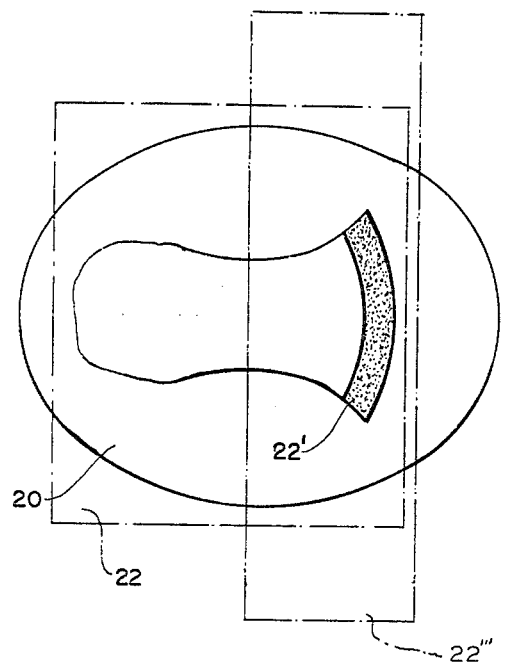
FIG. 3 is a plan view of the shell mold in placed on the head form with sheets of the hairpiece shown in overlying relation thereto, an area of resin impregnation being shown by stippling, positions of the sheets of material being shown in dot-dash and double dot-dash lines.

In FIG. 1 is shown a fragmentary portion of the head 10 having a fringe of hair 12 surrounding a bald spot 13. According to my method, the area of the head which is to receive the hairpiece and a section surrounding this areas are covered with a piece of wax paper parting sheet 14 which can be shaped to the contours of the head. The area of the head to receive the hairpiece is outlined on the wax paper with an appropriate transferable ink. The wax paper is overlaid with a first layer of fiber glass cloth 16, which is dampened so that it will receive a transfer from the ink and the fiber glass cloth is conformed to the shaped of the head. A layer of wetted fabric 17 impregnated with plaster of Paris is laid over the first fiber glass layer 16, and a second glass fiber cloth layer 18 is mounted over the plaster of Paris layer. The layers are shaped to conform to the contours of the head so that, when the plaster of Paris sets, the fiber glass fabric layers and the plaster of Paris unite to form a unitary shell mold. When the plaster of Paris dries, excess material is trimmed away until the shell mold is the size of the hairpiece and with edges of the shell mold extending to the crayon line marking the edge of the hairpiece. The shell mold can be impregnated with an appropriate resin, such as an epoxy resin, to strengthen it and render it durable.

The shellmold 19 (FIG. 2) is placed on a head form 20 and is overlaid with a wax paper parting sheet 21 and with a first sheet of glass fiber fabric cloth 22. The sheet 22 is shaped to conform to the shell mold, and a portion only of the sheet 22 in the form of a strip 22' (indicated by stippling in FIG. 3) adjacent the hair line edge of the shell mold is coated with a resin such as an appropriate epoxy resin. A wax paper parting strip or sheet 22'' (FIG. 2) of the same dimensions as the resin coated strip 22' is laid on the strip 22', and a second glass fiber fabric sheet 22''' is laid over the sheet 22 and is shaped to the contours of the shell mold 19 and is coated with the resin in an area overlying the resin coated strips 22'. The assembly of the head form 20, the shell mold 19, parting sheets and strip impregnated sheets is then heated to set the resin of the strips. As shown in FIG. 3, the sheet 22''' can be shorter than the sheet 22 and can cover only a portion of the shell mold including the edge at the hair line.

Figure 4:
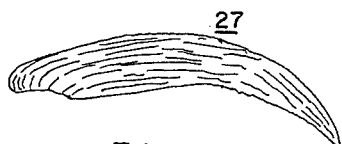
FIG. 4 is a view in side elevation of a completed hairpiece formed by my method.
Figure 5:
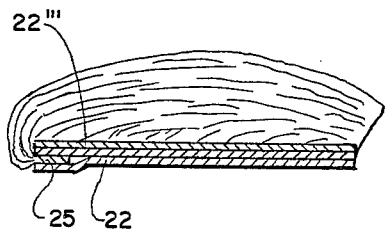
FIG. 5 is a fragmentary view in upright section of the hairpiece shown in FIG. 4.

Hair strands 23 are mounted and knotted in a sheet of fabric mesh 24 (FIG. 2), which can be silk gauze of the type commonly referred to as Swiss silk to form a ventilated fabric mesh. The portion of the glass fiber fabric sheets previously uncoated is now coated with the resin, and the ventilated fabric mesh 24 is mounted on the resin impregnated fiber glass fabric sheets with an edge portion 25 thereof extending outwardly beyond the strip 22'. The ventilated fabric mesh can be held in place by pins (not shown). The resin impregnates the portion of the mesh 24 overlying the shell mold other than the initially coated strips. The hair can be combined to the shape or style desired. Then the resin is set by heating the assembly of head form, shell mold, resin impregnated glass fiber fabric, and ventilated fabric mesh to an appropriate temperature. The resin bonds the fabric mesh to the resin impregnated glass fiber fabric sheets and locks the hair strands in place thereon. Excess fiber glass fabric and excess fabric mesh is trimmed away, and the parting strip 22'' is removed. Resin is brushed into the space between edges of the sheets 22 and 22''', and the edge portion 25 of the fabric mesh is turned inwardly, as shown in FIG. 5, between edge portions of the sheets 22 and 22'''. The edge portions are clamped together with appropriate clamps, not shown, and the assembly can then be further heated to set the resin on the inwardly turned edge to lock the edge in place between edge portions of the sheets 22 and 22' to form a finished hairpiece 27, as shown in FIG. 4. The parting sheet 21 makes it possible to strip the finished hairpiece from the head mold 20 when the resin has become set, and the parting sheet 21 can be stripped from the inside of the finished hairpiece. The hairpiece can then be attached to the head with an appropriate adhesive in the usual fashion. Since the edge 25 of the mesh is trapped between edges of the sheets 22 and 22''', the edge of the mesh is hidden, and the hair appears to emerge in a natural fashion along the hair line. The shell mold 19 can be stored for use in forming additional hairpieces and retains its shape indefinitely.

Having described my invention, what I claim as new and desire to secure by Letters Patent is:

1. A method of forming a hairpiece which comprises forming a shell mold conforming to the head which receives the hairpiece, mounting a glass fiber fabric sheet on the mold in overlying relation, the glass fiber fabric sheet conforming to and being coextensive with the hairpiece to be formed, mounting hair strands on a sheet of fabric mesh, impregnating the glass fiber fabric sheet with a resin, mounting the fabric mesh on the resin impregnated glass fiber fabric with the resin impregnating the fabric mesh and portions of the hair strands at the fabric mesh, and setting the resin to form an integral hairpiece in which the fabric mesh is bonded to the glass fiber fabric by the resin and the hair strands are locked in the resin.

2. A method as in claim 1 wherein the resin is an epoxy resin and the resin is set by heating an assembly of the shell mold, the resin impregnated fiber blass sheet, and the fabric mesh with hair strands mounted thereon to cure the resin.

3. A method as in claim 1 wherein the mold is formed by mounting a first sheet of glass fiber fabric on the head, mounting a sheet of fabric impregnated with plaster overlying the first glass fabric sheet, mounting a second glass fiber fabric sheet overlying the paster impregnated sheet, and moistening the plaster to set the first and second glass fiber fabric sheets into a unitary plaster bonded shell mold.

4. A hairpiece comprising a glass fiber fabric backing sheet conforming to and coextensive with the portion of the head which receives the hairpiece, a fabric mesh sheet with hair strands mounted therein overlying the glass fiber fabric backing and a resin impregnating the glass fiber fabric backing and uniting the fabric mesh thereto, portions of the hair strands adjacent the fabric mesh being locked in the resin.

5. A hairpiece as in claim 4 wherein the hair strands are knotted to the fabric mesh.

6. A hairpiece as in claim 4 wherein a second glass fiber fabric backing sheet overlies the first backing sheet at a hair line edge of the hairpiece and an edge portion of the fabric mesh sheet is locked in place by the resin between edges of the backing sheets.

7. A method of forming a hairpiece which comprises forming a shell mold conforming to the head which receives the hairpiece, mounting a pair of fabric backing sheets on the mold in overlying relation, one of said fabric backing sheets conforming to and being coextensive with the hairpiece to be formed and being attachable to the head, disposing a parting sheet between edge portions of the backing sheets at a hair line, mounting hair strands on a sheet of fabric mesh, impregnating the fabric backing sheets with a resin, mounting the fabric mesh on the resin impregnated fabric backing sheets with the resin impregnating the fabric mesh and portions of the hair strands at the fabric mesh and with an edge portion of the fabric mesh extending outwardly at the hair line, setting the resin to form an integral hairpiece in which the fabric mesh is bonded to the glass fiber fabric by the resin and the hair strands are locked in the resin, removing the parting sheet, disposing resin in the space from which the parting sheet has been removed, turning the outwardly extending edge portion of the fabric mesh into said space, and setting the resin in the space to lock the edge portion therein.

References Cited
UNITED STATES PATENTS

| 2,850,023 | 9/1958 | Taylor. | |
| 3,077,891 | 2/1963 | Lane | 132—5 |
| 3,189,035 | 6/1965 | Heck | 132—5 |

LOUIS G. MANCENE, Primary Examiner

JAMES W. MITCHELL, Assistant Examiner

U.S. Cl. X.R.

132—53

PO-1050
(5/69)

UNITED STATES PATENT OFFICE
CERTIFICATE OF CORRECTION

Patent No. 3,483,875                   Dated   December 16, 1969

Inventor(s)  William O. Trissell

It is certified that error appears in the above-identified patent and that said Letters Patent are hereby corrected as shown below:

Column 3, claim 2, line 29, "blass" should be -- glass --.
Column 3, claim 3, line 35, before "fabric" insert -- fiber --.
Column 3, claim 3, line 36, "paster" should be -- plaster --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents